United States Patent [19]

Brown

[11] Patent Number: 4,750,248

[45] Date of Patent: Jun. 14, 1988

[54] FILM AND PLATE REGISTRATION SYSTEM

[75] Inventor: Anthony J. Brown, Independence, Mo.

[73] Assignee: Press Ready Plate, Inc., Kansas City, Mo.

[21] Appl. No.: 857,149

[22] Filed: Apr. 29, 1986

[51] Int. Cl.[4] .............................................. B23B 39/16

[52] U.S. Cl. .......................................... 29/51; 408/42

[58] Field of Search .................. 29/26 A, 563, 51, 50; 408/42, 43, 44, 49, 50, 52, 53, 117, 37, 41

[56] References Cited

U.S. PATENT DOCUMENTS

| | | | |
|---|---|---|---|
| 1,692,318 | 11/1928 | Welk | 408/42 |
| 2,044,709 | 6/1936 | Lewis et al. | 408/49 |
| 2,736,968 | 3/1956 | Faeber | 33/184.5 |
| 2,745,186 | 5/1956 | Faeber | 33/184.5 |
| 2,907,274 | 10/1959 | Taylor | 101/401.1 |
| 3,186,336 | 6/1965 | Kirby | 101/216 |
| 3,983,808 | 10/1976 | Jackson | 101/401.3 |
| 4,004,509 | 1/1977 | Mass | 101/216 |
| 4,019,434 | 4/1977 | Hoexter | 101/216 |
| 4,033,259 | 7/1977 | Schuhmann | 101/174 |
| 4,146,350 | 3/1979 | Bokelmann | 408/41 |
| 4,449,452 | 5/1984 | Mansell | 101/382 MV |

FOREIGN PATENT DOCUMENTS

| | | | |
|---|---|---|---|
| 633947 | 2/1928 | France | 408/37 |

OTHER PUBLICATIONS

Brochure—Dupont Cyrel Registration System.

*Primary Examiner*—William R. Briggs
*Attorney, Agent, or Firm*—Wm. Bruce Day

[57] ABSTRACT

A registration system for flexible printing plates includes a drill apparatus and a registration table which, used in conjunction, makes registration and mounting of flexible printing plates on plate cylinders relatively quick and easy. The drill apparatus includes a table with spaced, opposed drills slideably mounted on tracks in the table to accommodate different plate widths. The registration table includes a guide against which the plate cylinder is positioned and a slideably mounted plate mounting bar to which the flexible plate is pinned. The plate mounting bar is swept parallelly toward the cylinder guide and the plate rolled on to the cylinder, and adhered by double sided sticky tape. The pins affixing the plate to the mounting bar are removed and the remaining plate material rolled on to the cylinder. The process ensures that a selected longitudinal axis of the plate will be in registration, or aligned, with the longitudinal axis of the cylinder.

3 Claims, 2 Drawing Sheets

FILM AND PLATE REGISTRATION SYSTEM

FIELD OF THE INVENTION

The present invention relates to apparatus for mounting printing plates on cylinders, and in particular, to registration and mounting means for affixing flexible printing plates on cylinders.

BACKGROUND OF THE INVENTION

When flexible printing plates, such as photopolymer plates, are mounted to print cylinders, a high degree of accuracy of the mounting of the plate to the cylinder is necessary so that the plate image is properly aligned, or registered. Extremely accurate standards must be followed in affixing the plate to the cylinder or else the images on the finished work will be blurred and overlap.

One method of registration of the printing plate to the plate cylinder is by exacting hand work, however, this type of lay up is extremely time consuming and expensive.

To assist in applying the printing plate to the cylinder, some methods employ plate drills which form precisely positioned holes in the plate. The work is pinned through the holes to a mounting bar which is then used to connect the plate to the plate cylinder.

The CYREL Registration System of Dupont, like the present system, is directed toward a particular film and plate drill apparatus and a registration bar which fits on the plate cylinder and is used to apply the printing plate to the cylinder. This system is complex and expensive and the present system provides advantages of speed and economy over the CYREL Registration System.

Although the present apparatus can be used in conjunction with any flexible printing plate, it is particularly advantageously used in connection with photopolymer printing plates, such is made by Dupont and other manufacturers.

OBJECTS OF THE INVENTION

The objects of the present invention are: to provide a plate drill apparatus which is configured to drill the necessary holes in a flexible printing plate; to provide such a plate drill apparatus which is adjustable to accommodate various sizes of printing plates; to provide such a plate drill apparatus which includes a positioning means which aids in drilling the plate in a selected alignment; to provide a registration table adaptable to different sizes of plates; to provide such a registration table which is adaptable to mount printing plates to various sizes of print cylinders; to provide such a registration table which fits the plate to a cylinder without requiring any adaptation to the plate cylinder; and to provide such a plate registration system which is relatively inexpensive and particularly well adapted for the intended purpose.

Other objects and advantages of this invention will become apparent from the following description taken in connection with the accompanied drawings wherein are set forth, by way of illustration and example, certain embodiments of this invention.

DESCRIPTION OF THE PREFERRED AND ALTERNATE EMBODIMENTS

Figure 1:
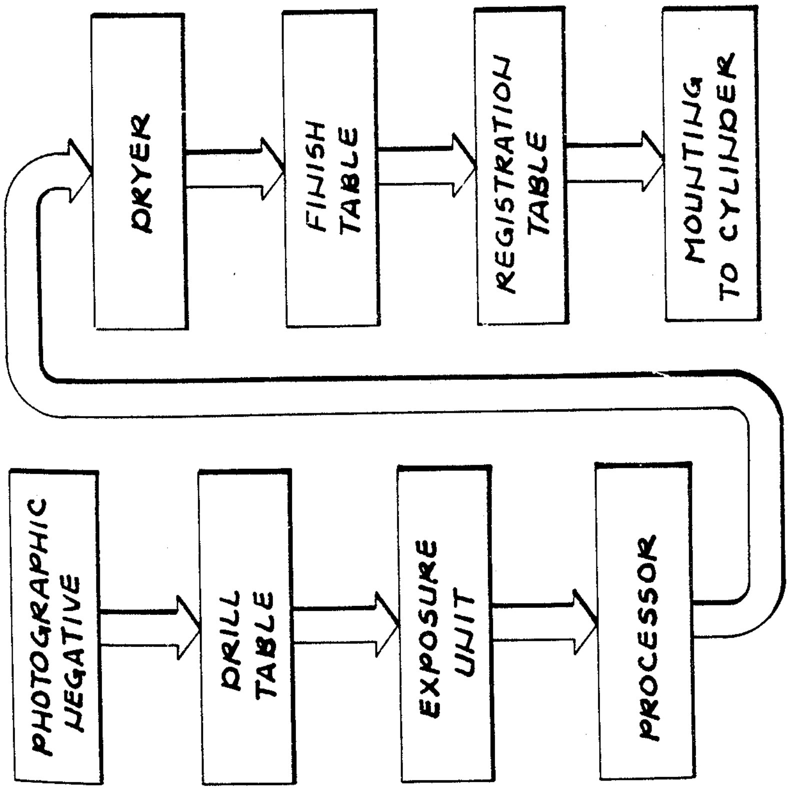
FIG. 1 is a schematic view of the steps taken in the process of preparing and mounting a printing plate to a plate cylinder.

As required, detailed embodiments of the present invention are disclosed herein, however, it is to be understood the disclosed embodiments are merely exemplary of the invention which may be embodied in various forms, therefore, specific structural and functional details disclosed herein are not to be interpreted as limiting, but merely as a basis for the claims and as a representive basis for teaching one skilled in the art to variously employ the present invention in virtually any appropriately detailed structure.

Figure 2:
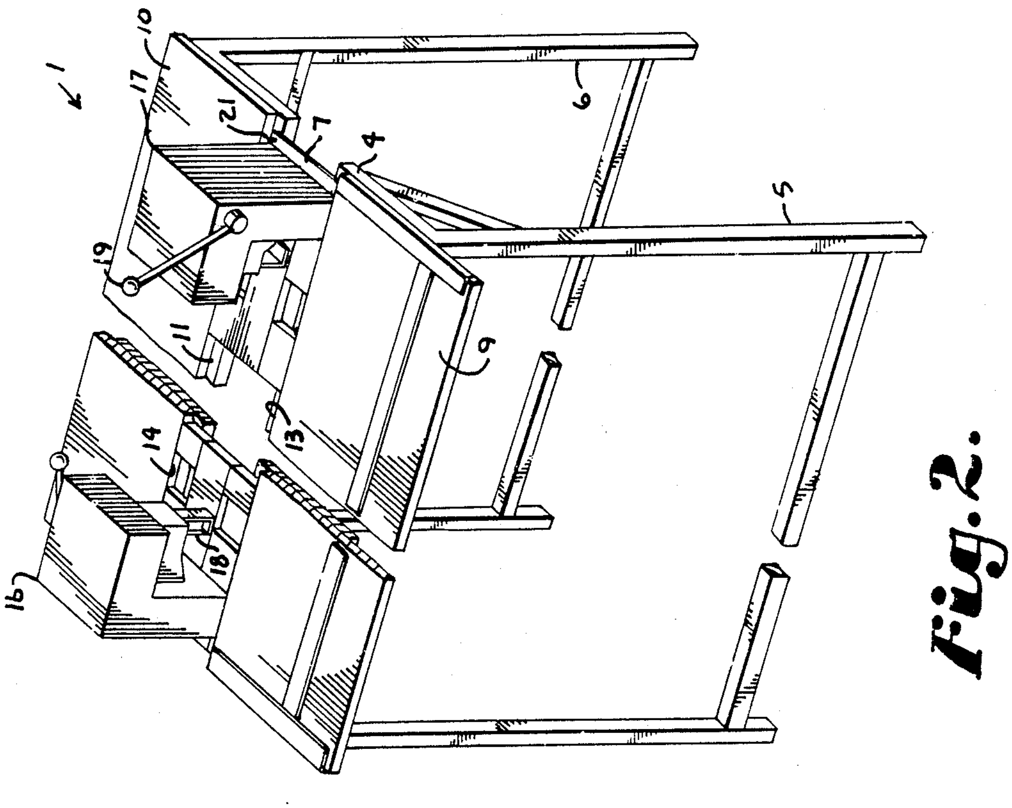
FIG. 2 is a perspective view of a drill table embodying the present invention.

Referring to the drawings in more detail:

The reference numeral 1, FIG. 2, generally indicates a drilling apparatus embodying the present invention. The reference numeral 2, FIG. 4, generally indicates a registration table, also embodying the present invention. Both the drilling apparatus 1 and registration table 2 are used in the process for preparing and mounting a printing plate to a plate cylinder and find particular use in the flexographic printing process.

Referring to FIG. 1, in the flexographic printing process, a photographic negative is made of the work to be printed and the negative combined with an unexposed or undeveloped printing plate is taken to the drill table, or the drilling apparatus 1. There, the plate and the photographic negative are drilled and then taken to an exposure unit which, in the flexographic printing process wherein a photopolymer plate is used, the exposure unit uses vacuum pressure to tightly engage the photographic negative to the plate and then expose the negative and the plate so the image of the work is transferred from the negative to the photopolymer plate. After exposure, the undeveloped plate is then taken to a processor unit which, through a series of solvent washes, removes the unimaged portions of the printing plate to a depth selected on the basis of processing time. The photopolymer plate, with the image formed thereon, is now taken to a dryer unit which dries the sticky plate material. In the next step, the plate is taken to a finishing table where various acid bath chemicals smooth the finish of the plate. Finally, the plate is transferred to a registration table where it is registered and precisely applied to a print cylinder. The cylinder is then taken to the press facility for operations.

Figure 3:
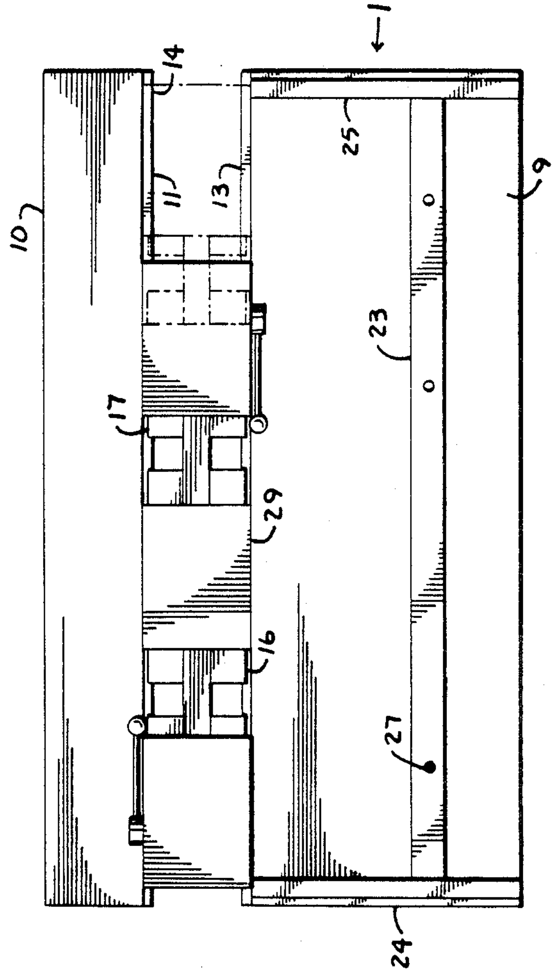
FIG. 3 is a plan view of the drill table.

Referring in detail to FIGS. 2 and 3, the drilling apparatus 1 is in the form of a drilling table 4 which includes front and rear sets of legs 5 and 6 and an upper connecting frame work 7, such as of square tube steel construction. The table 4 includes front and rear platforms 9 and 10, each with planar work surfaces.

Between the front and rear platforms 9 and 10 is a track 11 formed of parallel, spaced rails 13 and 14, such as also of the square tube construction, and which forms a mounting means for plate drills 16 and 17. In the illustrated example, each of the plate drills 16 and 17 is a commercially available drill head and includes a hollow bit 18 and a rotatable handle 19 for lowering the drill bit 18 to the printing plate. The plate drills 16 and 17 are connected by slides to the rails 13 and 14 and lock means, such as removable pins 21, are selectively connectable to holes spaced along the length of the rails 13 and 14 for setting the position of each of the plate drills 16 and 17.

The plate drills 16 and 17 are movable toward and away from each other on the rails 13 and 14 to accommodate various widths of a plate material, the width of which is governed by the size of the plate cylinder to which the plate is to be mounted.

Preferably, a plate positioning bar 23 extends across the front platform 9 and has opposite ends mounted in side tracks 24 and 25 for even, parallel movement toward and away from the track 11 containing the plate drill 16 and 17. The plate positioning bar 23 has a plurality of pin holes 27 along its length in to which pins are positioned in a conventional manner to affix photographic negatives and plate material so that they can be drilled.

In the illustrated example, a spacer means 29 such as of pre-selected lengths of blocks having a width to fit within the track 11 and with edges resting upon the rails 13 and 14, spaces the drills 16 and 17 apart. The length of each of the blocks of the spacer means 29 is selected to accord with a particular size of plate cylinder. As there are many different sizes of plate cylinders, a selection of different lengths of spacer means 29 is preferably maintained to quickly set the spacing between the plate drills 16 and 17.

Figure 6:
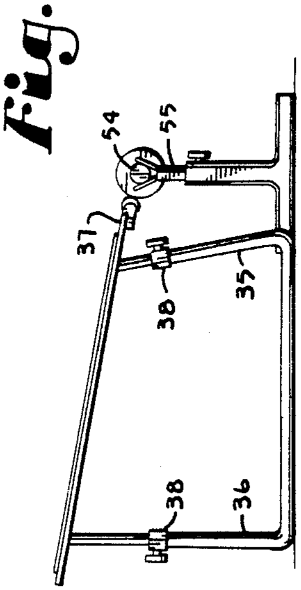
FIG. 6 is a side elevational view of the registration table showing tilt.
Figure 4:
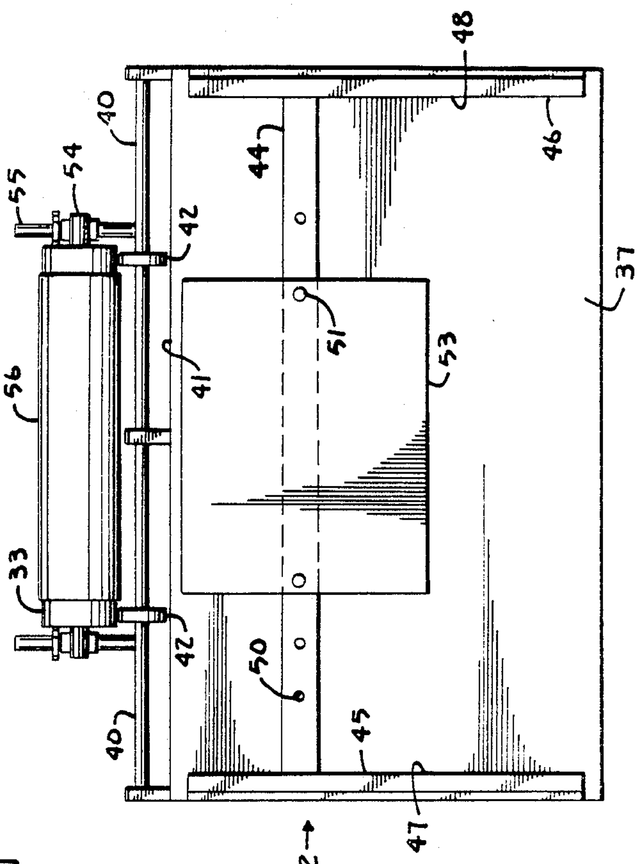
FIG. 4 is a plan view of a registration table embodying the present invention.
Figure 5:
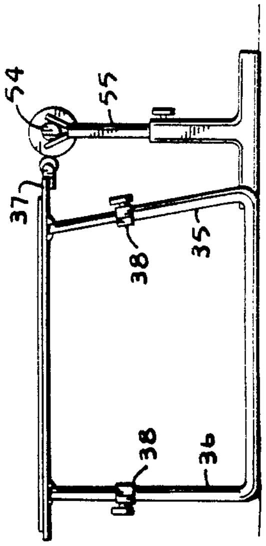
FIG. 5 is a side elevational view of the registration table with a plate cylinder positioned next to it.

The registration table 2, FIGS. 4, 5 and 6 is designed to mount the imaged and processed flexible printing plate to a plate cylinder 33 located adjacent the registration table 2, FIG. 4. In the illustrated example, the registration table 2 is formed of a table supported on front and rear sets of legs 35 and 36 with an upper, planar work surface 37 supported thereby. Preferably, at least the front legs 35 are adjustable in height to vary the tilt of the work surface 37 for ease of working thereon and transferring the plate to the plate cylinder 33. Tilt of the work surface 37 is controlled by extension of the front legs 35 through a tube lock 38. A guide rod 40 is mounted to the work surface 37 adjacent and outward of the table front edge 41 and has rollers 42 rotatable and slideably mounted on the guide rod 40 for lateral movement along the rod 40 to accommodate different size plate cylinders 33 and bear against the surface of the cylinder.

A plate mounting bar 44 extends across the work surface 37 and, in the illustrated example, is slideably affixed thereto by slide means including opposite rails 45 and 46 mounted to the opposite side edges 47 and 48 of the work surfaces 37. The side rails 45 and 46 position the plate mounting bar 44 parallel to the guide rod 40 for sweeping the plate mounting bar 44 across the work surface 37 parallel to the guide rod 40. The plate mounting bar 44 contains an array of pin holes 50 for inserting pins 51 in the bar pin holes 50 and pinning the printing plate thereto.

The plate cylinder 33, to which the printing plate 53 is to be affixed, is supported by its spindles 54 in a cradle 55 and positioned so that the plate cylinder 33 is in even contact with the rollers 42 on the guide rod 40. In this position, the longitudinal axis of plate cylinder 33 is parallel to the plate mounting bar 44.

In use, the printing plate 53, pre-drilled by the drilling apparatus 1 and with the drill bores aligned with the image thereon through conventional means, is processed, and after processing is brought to the registration table 2. Pins 51 are used to attach the printing plate 53 to the plate mounting bar 44 and the plate mounting bar 44 holds the plate 53 in place and in registration parallel with the longitudinal axis of the plate cylinder 33 while the printing plate 53 is applied to the cylinder 33. To mount the printing plate 53, the plate cylinder 33 is covered with a double sided, sticky backed tap 56 in the area of contact between the surface of the cylinder 33 and the plate 53 and the rollers 42 positioned so that they ride against the surface of the cylinder 33 and not in contact with the sticky backed tape 56. The plate mounting bar 44, with the printing plate 53 attached, is drawn toward the table front edge 41 and the overhanging lip of the printing plate 53 adhered to the plate cylinder 33. The plate cylinder 33 is gradually rotated, applying more and more of the printing plate 53 to the cylinder surface until no more of plate can be withdrawn because of the plate being pinned to the plate mounting bar 44. Thereupon, the pins 51 are removed and the plate 53 will be sufficiently secured to the cylinder 33 so that the remainder of the plate 53 can be rolled on to the cylinder without shifting of the plate 53.

By this procedure, orientation of the work to the longitudinal axis of the plate cylinder need only be done once, at the drilling apparatus 1, and from that point onward, registration of the printing plate 53 with the plate cylinder 33 is as easy as merely pinning the plate to the plate mounting bar 44 and then rolling the plate on to the plate cylinder 33. This procedure saves many hours of work and results in detailed registration of the selected longitudinal axis of the image with the longitudinal axis of the plate cylinder 33.

It is to be understood that while one form of this invention has been illustrated and described, it is not to be limited to the specific form or arrangement of parts herein described and shown, except insofar as such limitations are included in the following claims.

What is claimed and desired to be secured by Letters Patent is as follows:

1. A drill apparatus for drilling registration holes in plate ready film and flexible printing plates comprising:
(a) platform means;
(b) film and plate positioning means mounted to said platform means;
(c) track means in said platform means extending parallel to said film and plate positioning means;
(d) a pair of spaced, opposed plate drills movably mounted in said track means and movable toward and away from each other to accommodate film and plate of different sizes;
(e) lock means connected to said drills to affix said drills at selected locations along said track means; and
(f) spacer means removably positioned between said drills and mounted substantially level with said platform means to generally accord with and support film and plates of different sizes.

2. A drill apparatus for drilling registration holes in flexible printing plates and comprising:
(a) a table having a plate positioning bar extending thereacross;
(b) a track extending across said table and parallel to said plate positioning bar, said track including rails in said table;
(c) a pair of spaced, opposed plate drills movably mounted in said track and movable toward and away from each other to accommodate plates of different sizes;

(d) lock means extending between said drills and said track to affix said drills at selected locations; and (e) spacer means removably positioned between said drills and in said track to accord with plates of different sizes.

3. The drill apparatus set forth in claim 2 wherein:

(a) said plate positioning bar is slideably affixed to said table by slide means positioning said plate positioning bar parallel to said track for movement toward and away from said track.

* * * * *